No. 860,705. PATENTED JULY 23, 1907.
M. J. L. TOWLER.
AUTOMATIC HOLDING DEVICE FOR POWER TRANSMISSION MECHANISMS.
APPLICATION FILED FEB. 19, 1906.
2 SHEETS—SHEET 1.
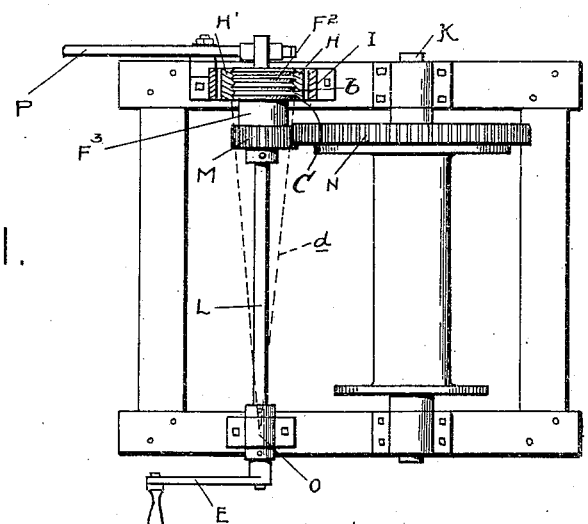
FIG.1.
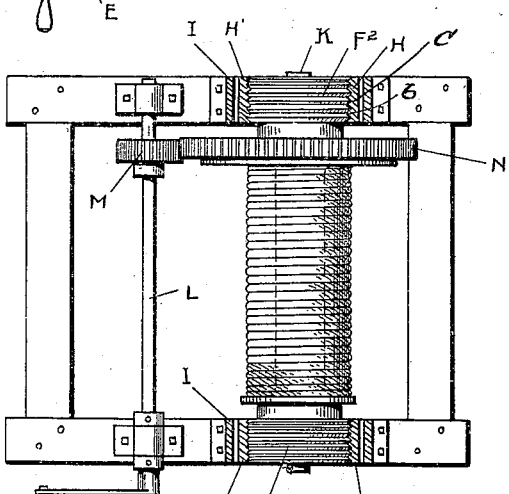
FIG.2.
FIG.5.
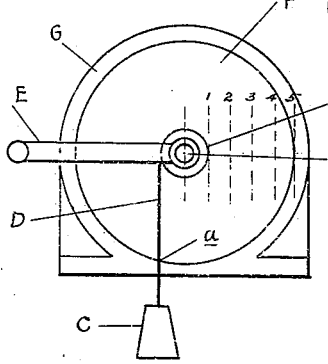
FIG.6.
FIG.7
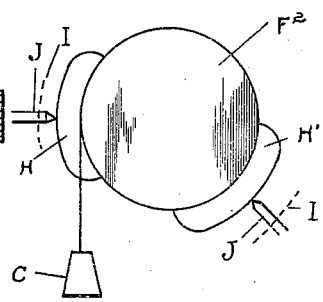
WITNESSES
Geo. W. Graves
Edward K. Cult
INVENTOR
MAXIMILIAN·J·L· TOWLER·
BY Whittemore, Hulbert & Whittemore
ATT'YS.
THE NORRIS PETERS CO., WASHINGTON, D. C.

No. 860,705. PATENTED JULY 23, 1907.
M. J. L. TOWLER.
AUTOMATIC HOLDING DEVICE FOR POWER TRANSMISSION MECHANISMS.
APPLICATION FILED FEB. 19, 1906.
2 SHEETS—SHEET 2.
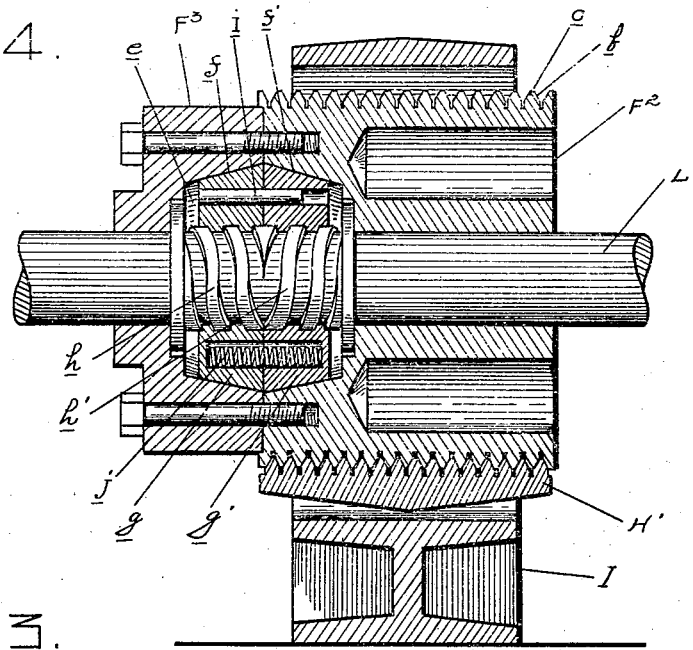
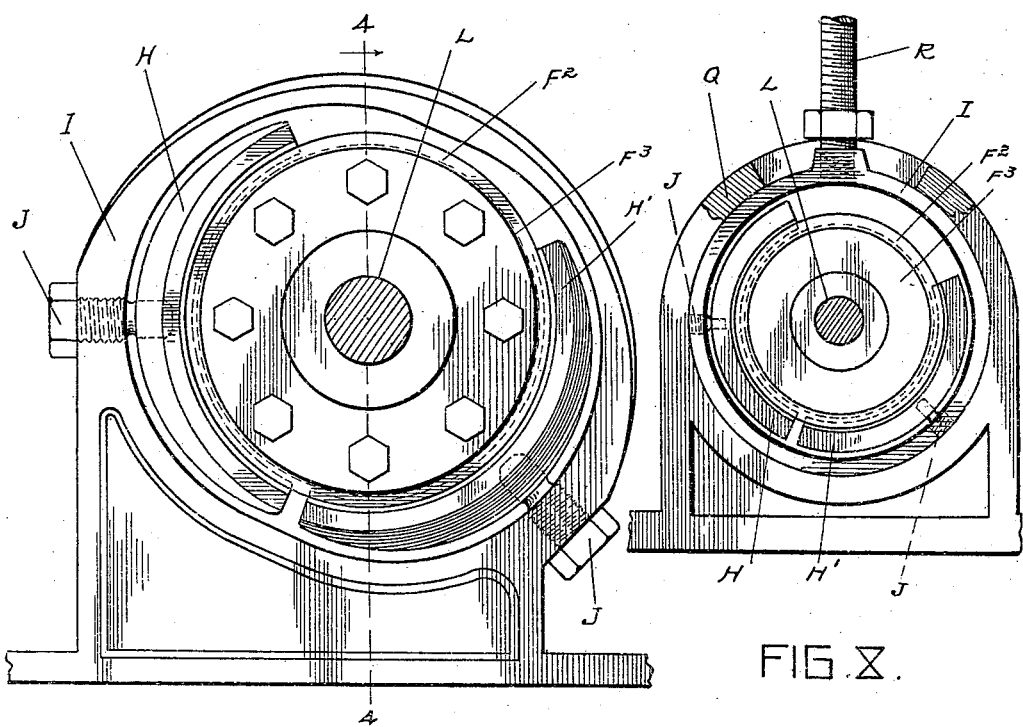
WITNESSES
INVENTOR
MAXIMILIAN J. L. TOWLER
BY Whittemore, Hulbert & Whittemore
ATT'YS.

UNITED STATES PATENT OFFICE.

MAXIMILIAN J. L. TOWLER, OF DETROIT, MICHIGAN.

AUTOMATIC HOLDING DEVICE FOR POWER-TRANSMISSION MECHANISMS.

No. 860,705.     Specification of Letters Patent.     Patented July 23, 1907.

Application filed February 19, 1906. Serial No. 301,933.

*To all whom it may concern:*

Be it known that I, MAXIMILIAN J. L. TOWLER, a citizen of the United States of America, residing at Detroit, in the county of Wayne and State of Michigan, have invented certain new useful Improvements in Automatic Holding Devices for Power-Transmission Mechanism, of which the following is a specification, reference being had therein to the accompanying drawings.

The invention relates generally to power transmission mechanism and has more particular reference to winding drums or hoists.

It is the object of the invention to provide means for holding the load at any point which will not interfere with either the raising or the lowering of the same by the power transmission.

It is a further object to provide such a holding means without adding resistance to the lifting of the load, and to permit of lowering with a small amount of power, regardless of the amount of load.

With these objects in view, the invention consists in the construction as hereinafter set forth.

In the drawings, Figure 1 is a sectional plan view of a hoisting drum to which my invention is applied; Fig. 2 is a similar view, illustrating a modified construction; Fig. 3 is an elevation of the holding device; Fig. 4 is a cross section therethrough on line 4—4 Fig. 3; Fig. 5 is a diagram illustrating a simple construction of the holding device; Fig. 6 is a longitudinal section through a modified construction; Fig. 7 is an elevation of another modification; and Fig. 8 is an elevation similar to Fig. 3, showing a modification.

My invention is based on the well-known principle in mechanics that where two relatively movable bodies are in frictional contact, any force applied to the one so directed as to be within the limiting angle of friction, will produce no movement, but will only result in holding the surfaces in firmer contact. Making use of this law, my invention broadly consists in providing a transmission mechanism having power and load connections with a friction bearing, so proportioned and positioned that the force from the power connection will operate upon said bearing outside the limiting angle of friction, and the force from the load will react upon the bearing within said angle.

In Fig. 5 of the drawings, a simple embodiment of my invention is illustrated, in which A is an axle, B a drum or pulley attached thereto and operating upon a load C through the medium of a cable D, and E is a crank handle for rotating the axle. F is a journal upon the axle A, which is enlarged to a diameter exceeding that of the drum B and such that the plane of the cable D will intersect the perimeter of the journal within the angle of friction. G is a bearing embracing the journal F. With the construction described, any force operating through the medium of the crank E to rotate the axle A, will react upon the bearing G outside of the angle of friction, so that the load C may be either raised or lowered. On the other hand, the force of the load C, acting tangentially upon the drum B, will react upon the bearing G in the same plane, *i. e.* at the point $a$, which will be within the angle of friction and, consequently, no movement can be imparted to the drum through this medium, however great the force. The construction just described may be applied to various uses but requires the use of a bearing G of considerable size. I have therefore devised a modified construction, in which the diameter of the bearing may be greatly reduced and the same holding effect obtained.

As illustrated in Fig. 6, $F'$ is a journal and $G'$ a bearing therefor in which the contacting surfaces are at an angle to the axis of the axle A and so as to form a groove in the one engaged by the other. The effect of such an engagement is (from the fact that the bearing surface is increased and the pressure per unit of surface remains the same) to increase the amount of resistance from friction in proportion to the load and thus the diameter of the bearing relative to that of the drum may be diminished.

In Fig. 7, a further means is illustrated, whereby the size of the journal may be reduced. In this construction, the journal $F^2$ is supported at two bearing points, so located as to produce a wedging effect when the journal is rotated, thereby increasing the friction. To provide a sufficient amount of bearing surface in contact with the journal, the segmental shoes H H' are employed, which shoes are supported in the stationary bearing I by means of the set-screw J or other pivotal connection. Thus the force acting through the drum upon the bearing will be concentrated at the two pivotal points and the size of the journal may be reduced, while still maintaining the resultant of the reactive force from the load within the angle of friction.

By combining the features separately illustrated in Figs. 5, 6 and 7 and by a suitable proportioning of parts, the size of the journal may be reduced to a diameter substantially equal to that of the drum, while still maintaining the reactive force from the latter within the angle of friction. Such a construction is illustrated in Figs. 1 to 4 of the drawings, the detail construction of the holding means being as follows:—$F^2$ is the journal which may be applied either directly to the drum shaft K, as illustrated in Fig. 2, or to a winding shaft L, from which power is transmitted to the drum, as by the pinion M and gear wheel N, this being shown in Fig. 1. In the latter construction, the size of the journal must be at least equal in diameter to that of the pinion M, but its size relative to the drum is immaterial. The journal $F^2$ is provided on its perimeter with a series of circumferential grooves $b$, leaving the intervening ribs $c$ of V-shaped cross section. The shoes H are of complementary shape and are pivotally supported by the set-screws J or other suitable pivotal supports, so as to produce the wedging effect described. I have found that by placing these supports for the two shoes, the one at an angle of forty-five degrees and the other at an angle of ninety degrees to the perpendicular, the best effect is produced.

In the construction illustrated in Fig. 2, two of the journals are arranged respectively at opposite ends of the drum shaft. With such an arrangement, the length of the drum is immaterial and, if its maximum diameter (when the cable is wound thereon) does not exceed the diameter of the journal, the locking will be effective. In Fig. 1, a single locking journal is applied to the shaft L at one end thereof and adjacent to the pinion M through which power is transmitted to the drum. With such a construction, it is important that the size of the pinion should be within the cone indicated by the dotted lines $d$, extending from the journal $F^2$ to the center of the bearing O for the opposite end of the shaft. Thus if the pinion is shifted in position longitudinally upon the shaft away from the locking bearing, it must be proportionately diminished in size, as the effective tangential force on the bearing from the pinion diminishes and a rotary force on the bearing increases. On the other hand, the crank E, through which power is applied to the shaft L, being arranged outside of the bearing O, transmits practically a rotary force only to the holding journal bearing, which is not effected and, therefore, said crank can be of any size and a force applied thereto in either direction will simply cause the journal to revolve. As the function of this journal is merely to hold the load when the mechanism is at rest, it is desired to eliminate the friction of the journal $F^3$ in its bearing during the lifting of the load. This may be accomplished by providing a clutch for attaching the journal $F^2$ to the axle, which automatically releases during the winding operation and engages upon a reverse movement of the shaft. The specific construction of the clutch which I preferably employ for this purpose does not form the subject-matter of the present invention but, as illustrated, is of the following construction:—

The journal member $F^3$ is sleeved upon the shaft and is provided with a recess $e$ having the opposed conical faces $f f'$.

$g g'$ are collars having complementary conical faces and engaging right and left threaded portions of the shaft $h h'$. $i$ are pins engaging apertures in said collars to hold the latter from relative rotation and $j$ are springs in recesses in the collars, the tension of which acts to force the collars apart. In operation, the rotation of the shaft in one direction will, through the medium of the right and left screws $h h'$, move said collars towards each other, withdrawing their conical faces from contact with the corresponding conical faces of the journal $F^2$ in the recess $e$. On the other hand, a rotation of the shaft in the opposite direction will force the collars apart, causing them to clamp the complementary faces on the member $F^2$ and thereby locking said member to the shaft. Thus in the rotation of the shaft to lift the load, it will turn freely within the member $F^2$, the latter remaining stationary in the supporting bearings formed by the shoes H H', but the initial movement of the shaft in the opposite direction will engage the clutch, coupling the journal $F^2$ to the shaft and causing the latter to lock, as has been previously described.

In the description thus far given, it has been stated that the force reacting from the load upon the bearing is within the angle of friction. In the practical construction of the bearing, it is important not only to secure this effect but also to so proportion the parts that the resultant reactive force from the load is applied approximately at the angle of friction, i. e. it is located as near the limiting angle as practicable with a proper factor of safety, so that the journal is in a state of indifference to rest or motion, in a direction to lower the load. The object to be attained by this construction is to diminish the power required to lower the load and, where the parts are carefully proportioned, a load, however great, may be lowered by the application of an infinitely small force.

The lowering of the load may be effected in various ways, two of which are illustrated in the drawings. In Fig. 1, a lever P is fulcrumed so as to bear against the journal at a point where a slight pressure will relieve the friction and permit the journal to revolve. In Fig. 8, another means is illustrated in which the frame I is adjustably secured in an outer bearing frame Q and a lever R is connected, so as to be capable of imparting a slight rotary movement to said frame I. Thus by rotating the frame I in one direction or the other, the positions of the pivotal points J relative to the point of application of the tangential force from the load are altered, and the resultant reactive force upon the bearing may thus be made to follow, either within or without the angle of friction, according to the adjustment. By either of the means illustrated in Figs. 1 and 8 respectively, the operator may lower the load without the necessity of turning the crank. If, however, it is desired to lower through the medium of the crank, this may be done with the application of a small force only.

In certain constructions of apparatus, it may be desirable at times to have an adjustment where the reactive force from the load is well within the angle of friction and at other times as near as practicable to the limit. These conditions may be fulfilled by the construction illustrated in Fig. 8, in which a slight adjustment of the lever R will shift the point of application of the reactive force to the bearing.

From the description given, it will be understood that my improved holding means has certain marked advantages over devices that have heretofore been used for a similar purpose. For instance, the ordinary worm gear construction will hold the drum from movement under the action of the load, but it introduces a large element of friction, resisting the turning of the drum, in the lifting of the load.

A further advantage of my construction is that it is capable of direct application to the drum shaft or other rotating member to which the load is attached, and this avoids possibility of accident, such as due to the breaking of a gear, by which the load might be released from the holding means.

What I claim as my invention is,—

1. The combination with a rotatable member provided with a tangentially-extending load connection, of a journal for said member arranged relative to said load conection, so that the resultant of the reactive force therefrom will be within the angle of friction, and means permitting a rotation of said member independent of said journal in a direction to lift the load.

2. The combination with a rotatable member provided with a tangentially-extending load connection, of a journal and coöperating bearing for said member arranged relative to said load connection that the resultant of the reactive force therefrom will operate upon said bearing within the angle of friction and a clutch connecting said journal and rotatable member, permitting the independent rotation of the latter in a direction to lift the load and automatically coupling therewith when reversely rotated.

3. The combination with a rotatable member having a load operating tangentially thereupon, of a journal bearing for said member substantially equal in radius to the portion connecting with the load and constructed so that the resultant force from the later will react thereupon within the angle of friction.

4. The combination with a rotatable member having a load connected tangentially thereto, of a journal and coöperating bearing for said member constructed to increase the resistance from friction, whereby the resultant reactive force from said load is within the angle of friction, and the diameter of the journal is less than that necessary with a bearing parallel to the axis and also within the limiting angle.

5. The combination with a rotatable member having a tangential load connection, of means for holding said rotatable member in a condition of indifference to rest or motion.

6. The combination with a rotatable member having a tangential load connection, of a bearing for said rotatable member relatively proportioned and arranged that the resultant of the force reacting from the load is applied to said bearing approximately at the angle of friction, and means for adjusting said bearing to shift the point of application of said reactive force, either outside or within the limiting angle.

7. The combination with a rotatable member provided with a tangential load connection, of a bearing for said member so proportioned and arranged that the resultant of the force reacting from the load thereupon is within the angle of friction, and means for relieving the friction to permit the automatic lowering of the load.

8. The combination with a rotatable member, of a journal bearing therefor constructed to frictionally resist the rotation of said member in one direction, while permitting comparative freedom of rotation in the opposite direction.

9. The combination with a rotatable member, of a journal bearing therefor constructed to introduce a large element of friction to the rotation of said member in one direction and permitting comparative freedom of rotation in the opposite direction.

10. The combination with a rotatable member, of a journal bearing therefor constructed to increase the friction to rotation in one direction resulting from the load, while permitting freedom of rotation in the opposite direction.

In testimony whereof I affix my signature in presence of two witnesses.

MAXIMILIAN J. L. TOWLER.

Witnesses:
 AMELIA WILLIAMS,
 JAMES P. BARRY.